(12) United States Patent
Wang et al.

(10) Patent No.: US 10,291,347 B2
(45) Date of Patent: May 14, 2019

(54) EFFECTIVE CROSS-LAYER SATELLITE COMMUNICATIONS LINK INTERFERENCES MITIGATION IN THE PRESENCE OF VARIOUS RFI TYPES

(71) Applicant: INTELLIGENT FUSION TECHNOLOGY, INC., Germantown, MD (US)

(72) Inventors: Gang Wang, Germantown, MD (US); Xin Tian, Germantown, MD (US); Zhihui Shu, Germantown, MD (US); Wenhao Xiong, Germantown, MD (US); Tien M. Nguyen, Yorba Linda, CA (US); Khanh D. Pham, Kirtland AFB, NM (US); Erik Blasch, Rome, NY (US); Dan Shen, Germantown, MD (US); Zhonghai Wang, Germantown, MD (US); Genshe Chen, Germantown, MD (US)

(73) Assignee: INTELLIGENT FUSION TECHNOLOGY, INC., Germantown, MD (US)

( * ) Notice: Subject to any disclaimer, the term of this patent is extended or adjusted under 35 U.S.C. 154(b) by 0 days.

(21) Appl. No.: 15/397,640

(22) Filed: Jan. 3, 2017

(65) Prior Publication Data
US 2018/0191457 A1    Jul. 5, 2018

(51) Int. Cl.
H04B 7/185    (2006.01)
H04K 3/00    (2006.01)
(Continued)

(52) U.S. Cl.
CPC .............. *H04K 3/25* (2013.01); *H04B 1/0028* (2013.01); *H04B 1/715* (2013.01); *H04B 17/345* (2015.01);
(Continued)

(58) Field of Classification Search
CPC ...... H04K 3/25; H04B 17/391; H04B 1/0028; H04B 1/715

USPC ....................................................... 455/114.2
See application file for complete search history.

(56) References Cited

U.S. PATENT DOCUMENTS

| 6,240,124 B1 * | 5/2001 | Wiedeman | H04B 7/18534 |
| | | | 370/318 |
| 6,745,005 B1 * | 6/2004 | Lou | H04B 7/18517 |
| | | | 455/10 |

(Continued)

OTHER PUBLICATIONS

G. Wang, K. Pham, E. Blasch, T. M. Nguyen, G. Chen, et al., "Optimum design for robustness of frequency hopping system," IEEE Military Communications Conference, MILCOM, MD, USA, Oct. 2014 pp. 1-7.
(Continued)

*Primary Examiner* — Sonny Trinh
(74) *Attorney, Agent, or Firm* — Anova Law Group, PLLC

(57) ABSTRACT

A systematic interferences mitigation design for protected satellite communications (SATCOM) is provided. An advanced channel coding is designed to provide coding gain for SATCOM even in the presence of synchronization errors because of unintentional and intentional radio frequency interferences (RFIs). A unified SATCOM system spectrum efficiency and energy efficiency performance model is developed with a unified interference model for SATCOM dynamic resource allocation (DRA). The SATCOM system DRA is designed with a game theoretic engine and link optimizations providing traffic control, power control, frequency hopping pattern selection, beamforming codebook selection, and modulation with coding agile waveform adaptations. The interferences mitigation design is implemented with software defined radio USRP and GNU-radio to maintain communication link quality of services (QoS).

20 Claims, 4 Drawing Sheets

System Diagram for Cross-Layer SATCOM Interference Mitigation Scheme

(51) Int. Cl.
  *H04B 17/391* (2015.01)
  *H04B 1/715* (2011.01)
  *H04B 1/00* (2006.01)
  *H04B 17/345* (2015.01)
  H04L 27/00 (2006.01)
  H04B 7/19 (2006.01)

(52) U.S. Cl.
  CPC ............. *H04B 17/391* (2015.01); *H04B 7/19* (2013.01); *H04B 2201/692* (2013.01); *H04B 2201/71323* (2013.01); *H04L 27/0006* (2013.01); *Y02D 70/168* (2018.01); *Y02D 70/446* (2018.01)

(56) References Cited

U.S. PATENT DOCUMENTS

| | | | |
|---|---|---|---|
| 8,335,468 B2 | 12/2012 | Jayasimha | |
| 9,344,125 B2* | 5/2016 | Kpodzo | H04B 1/1027 |
| 9,831,901 B2* | 11/2017 | Kpodzo | H04B 1/1027 |
| 2004/0185775 A1* | 9/2004 | Bell | H04B 7/18515 |
| | | | 455/12.1 |
| 2017/0238216 A1* | 8/2017 | Damnjanovic | H04B 17/309 |
| | | | 455/427 |
| 2018/0103381 A1* | 4/2018 | Ramamurthi | H04W 16/28 |
| 2018/0269999 A1* | 9/2018 | Budyta | H04W 4/046 |

OTHER PUBLICATIONS

D. Shen, G. Chen, G. Wang, et al., "Network survivability oriented markov games (NSOMG) in wideband satellite communications," IEEE/AIAA Digital Avionics Systems Conference, CO, USA, Oct. 2014 pp. 1-9.

\* cited by examiner

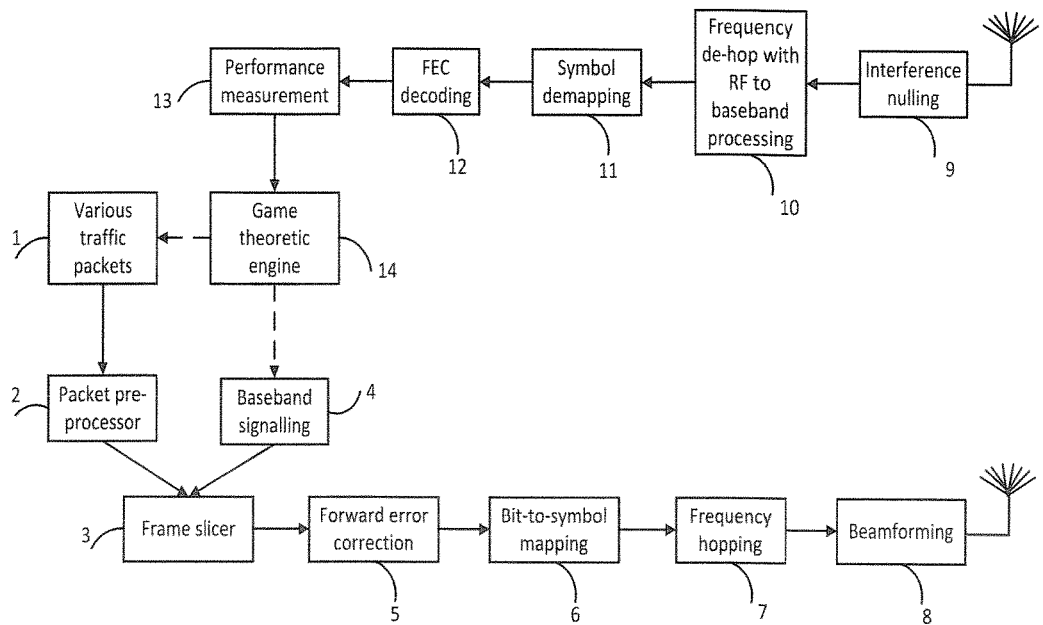
FIG. 1 System Diagram for Cross-Layer SATCOM Interference Mitigation Scheme
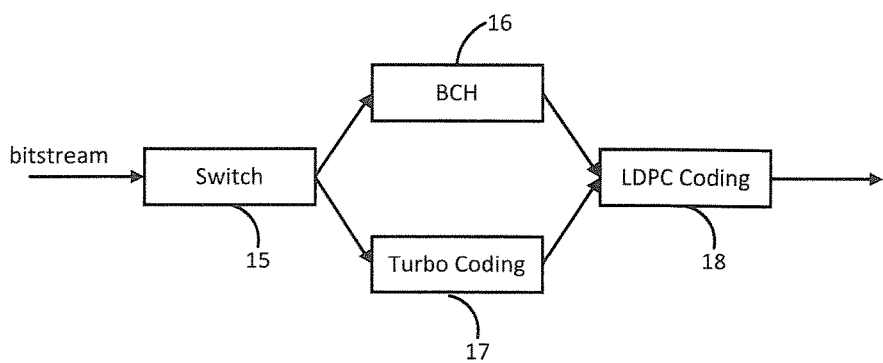
FIG. 2 Enhanced SATCOM Channel Coding Scheme

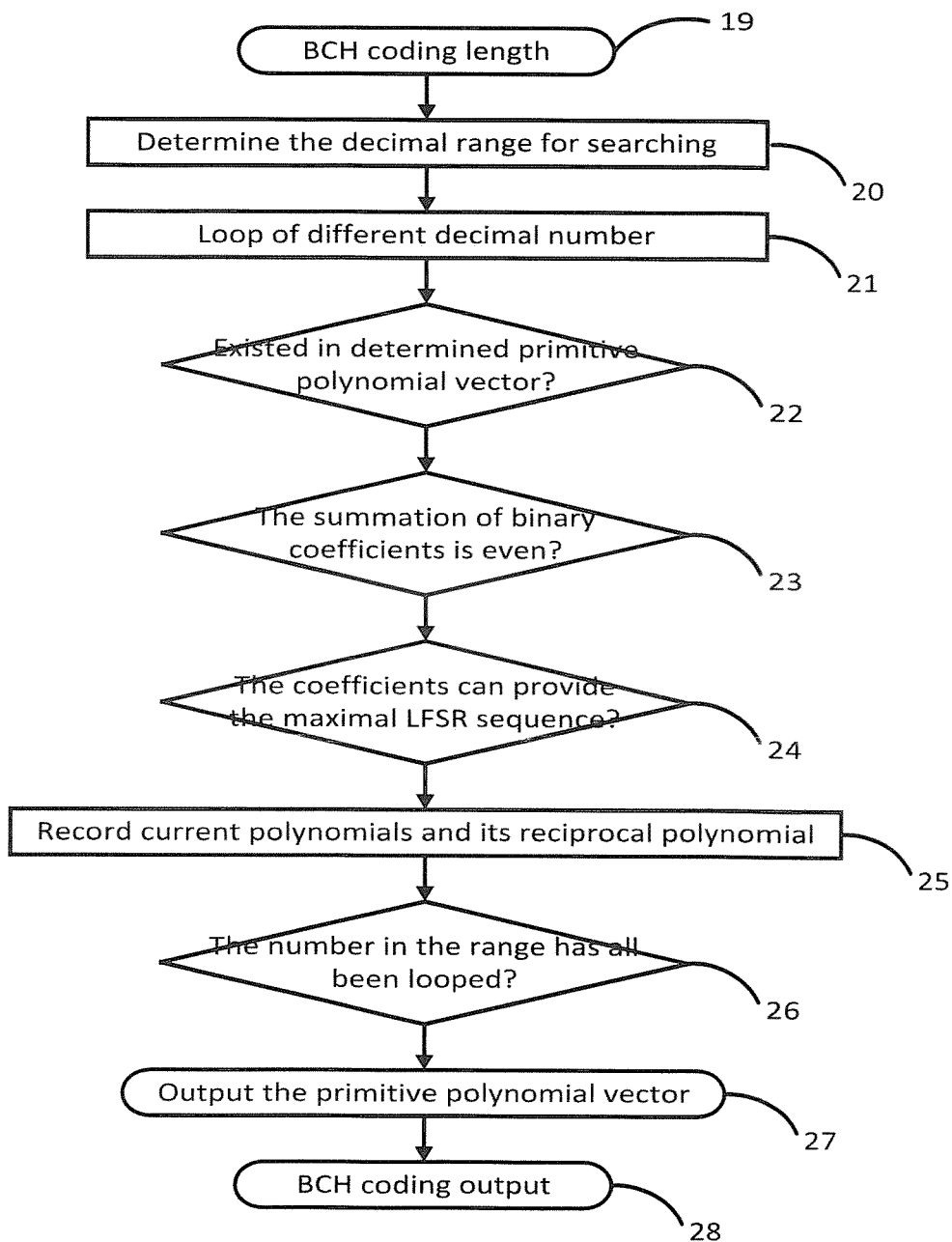
FIG. 3 Developed BCH Coding Scheme

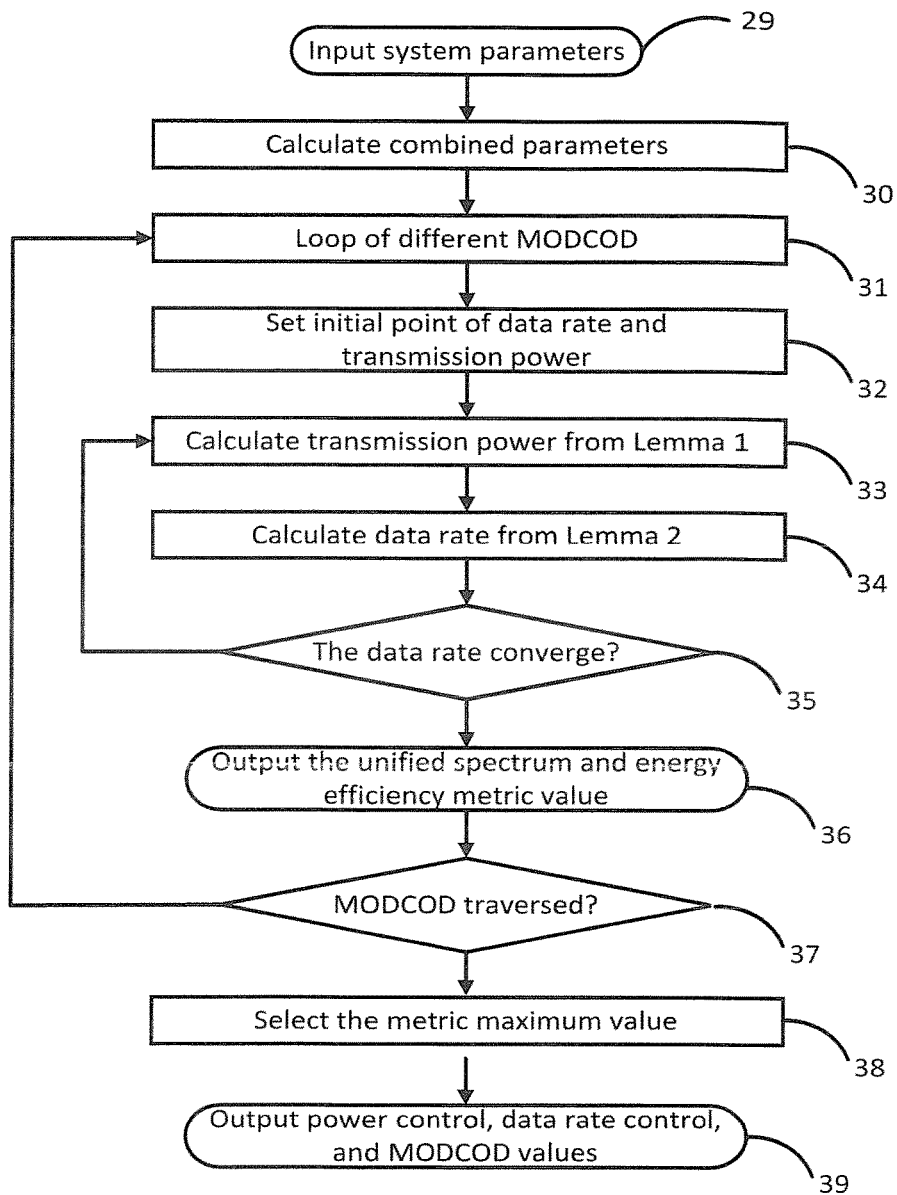
FIG. 4 Cognitive radio joint power control, rate control, and MODCOD adaptive configuration

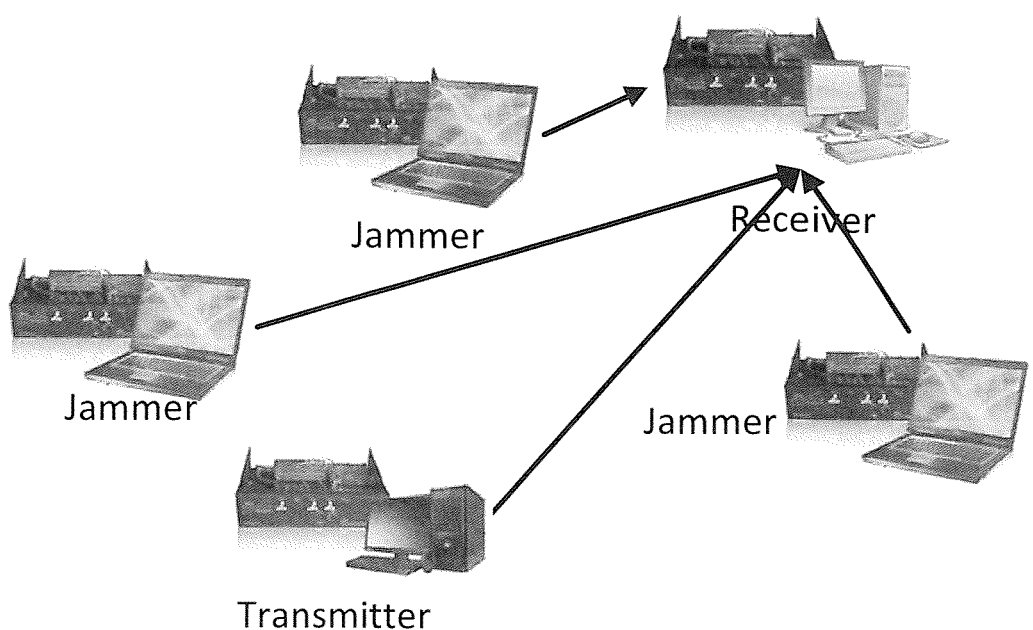
FIG. 5 Cognitive radio hardware implementations

EFFECTIVE CROSS-LAYER SATELLITE COMMUNICATIONS LINK INTERFERENCES MITIGATION IN THE PRESENCE OF VARIOUS RFI TYPES

GOVERNMENT RIGHTS

The present disclosure was made with Government support under Contract No. FA9453-15-M-0425, awarded by the United States Air Force Research Laboratory. The U.S. Government has certain rights in the present disclosure.

FIELD OF THE DISCLOSURE

The present disclosure generally relates to the field of cognitive radio transmission, reception, system optimizations, and dynamic configurations for satellite communications (SATCOM) in a Radio Frequency Interference (RFI) environment. More particularly, the disclosure relates to the anti-jamming effective system design and methods with a cognitive radio testbed apparatus.

BACKGROUND

In the satellite communications (SATCOM) infrastructure, both space-borne and heterogenous space-terrestrial systems will require assured connection capabilities, enhanced defensive control, and robust performance to support complex collaborative missions.

Wideband geosynchronous orbit (GEO) SATCOM can provide high-capacity and large coverage for various terrestrial applications, industry operations, and interested users. GEO SATCOM continuous operations in the open wireless environment with interferences including unintentional interferences and intentional interferences are critical to individual, cooperation, and government operations.

Each GEO satellite provides services in both the X and Ka frequency bands, with the capability to cross-band between the two frequencies onboard the satellite. It features an electrically steerable and phased array X-band, a mechanically steered Ka-band, and a fixed earth-coverage X-band. These wideband SATCOM networks entail extreme complexity, operating environment unpredictability, and interferences susceptibility.

Therefore, it is essential to develop cognitive system and dynamic spectrum management solutions that are not only context-aware and capable of learning and probing for subscriber distributions, quality of services, mission priorities and traffic patterns, but also agile in waveform adaptations to provide active countermeasures for ubiquitous persistent and adaptive RF interferences (RFI).

In addition, to provide accurate and reliable performance evaluation results to guide cognitive spectrum SATCOM development, abstracted system models must be built practically to evaluate various important techniques, including frequency-hopping spread spectrum (FHSS), channel coding, and anti-jamming capability. The practical models include FHSS and unified interferences model including unintentional and intentional RFIs. The performance evaluation metric is unified system spectrum efficiency and system energy efficiency.

BRIEF SUMMARY OF THE DISCLOSURE

One aspect or embodiment of the present disclosure includes satellite communications (SATCOM) effective system design and various methods for anti-jamming capability in the unintentional and intentional RFIs in a satellite. Various network traffic packets are firstly partitioned as frames, which are processed with baseband signaling system parameters. With the signaling configuration, information bits are encoded with forward error correction (FEC) scheme. The bits are then formed into symbols based on the bit-to-symbol mapping scheme. To avoid severe interferences, frequency hopping (FH) is applied. For further interferences mitigation, beamforming is applied to transmit the signal in a desired direction. At the receiver, interference nulling or an equivalent scheme is applied to reduce the intentional interferences power. Afterwards, the frequency de-hopping and synchronizations are performed to transform the radio frequency signal to baseband signal. Symbol de-mapping and FEC decoding is then performed for the link performances measurement.

In response to practical adaptive interferences, a game reasoning process is performed to configure system parameters including transmission power, traffic data rate, frequency hopping pattern, modulation and coding (MOD-COD), and the beamforming precoding matrix, to provide a system-level anti-jamming adaptive configurations.

Optionally, different FEC schemes are applied in benign or heavy interferences environments for quality of services (QoS) improvement while maintaining information recovering low complexity.

Optionally, the waveform modulation is performed to transmit the signal in one of a number of frequency bands.

Optionally, beamforming is applied for multiple antennas transmitter to enhance directional performance for reducing probability of detection and increasing the received intended signal signal-to-interference-and-noise ratio (SINR) for interferences mitigations.

Optionally, the interferences of narrowband interference, wideband interference, radar sources, and intelligent jammers states can be estimated via space object automatic target detection, recognition, and classification methods.

Optionally, the interferences are classified as both intentional and unintentional interferences.

Optionally, interference nulling at a receiver is performed for multiple antennas receiver configurations or omitted for single antenna system.

Optionally, a game reasoning process obtains the following information: a space object propagator provides the location and a speed of a current satellite in the SATCOM system; a SATCOM performance evaluation toolkit determines the link budget information, and the spectrum sensing determines the situational awareness of the current SATCOM link.

Optionally, in the game reasoning process, a transmission pair and adversaries are included.

Optionally, the game reasoning process is implemented by, a transmitter, a receiver, and multiple jammers, each including a Universal Software Radio Peripheral (USRP) configured with Gnu's not Unix (GNU) Radio.

Optionally, each player obtains the information of the opponent by spectrum sensing and signal detection.

Optionally, the traffic includes voice traffic, video traffic, image traffic, and text.

Optionally, the waveform of the source data includes a wideband GEO SATCOM waveform transmitted in the SATCOM system via GEO satellites.

Optionally, the SATCOM anti-jamming waveform is adapted and selected with two levels optimizations by the system-level game engine and SATCOM link optimizer.

Optionally, the SATCOM waveform is transmitted with assigned signaling parameters from the transmitter to the receiver, which is then demodulated and decoded for information recovery.

Optionally, performance measurements include the frame error rate, system outage, spectrum efficiency, and energy efficiency.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

FIG. 1 depicts a system block diagram illustrating exemplary satellite communications (SATCOM) anti-jamming cross-layer systematic design with various methods according to various disclosed embodiments;

FIG. 2 depicts a block diagram illustrating an exemplary enhanced SATCOM channel coding scheme according to various disclosed embodiments;

FIG. 3 depicts a Bose-Chaudhuri (BCH) coding scheme according to various disclosed embodiments;

FIG. 4 depicts SATCOM cognitive radio adaptive waveform configurations according to various disclosed embodiments; and FIG. 5 depicts an exemplary cognitive radio testbed apparatus for implementing exemplary SATCOM anti-jamming designed system and methods according to various disclosed embodiments.

DETAILED DESCRIPTION

Reference will now be made in detail to exemplary embodiments of the disclosure, which are illustrated in the accompanying drawings. Wherever possible, the same reference numbers will be used throughout the drawings to refer to the same or alike parts. In the following description, reference is made to the accompanying drawings that form a part thereof, and in which is shown by way of illustration specific exemplary embodiments in which the disclosure may be practiced.

These embodiments are described in sufficient detail to enable those skilled in the art to practice the disclosure and it is to be understood that other embodiments may be utilized and that changes may be made without departing from the scope of the disclosure. The following description is, therefore, merely exemplary.

Various embodiments provide a satellite communication (SATCOM) effective interferences mitigation system design with various methods, based on which a transmitter and a receiver could communicate via SATCOM even in the interferences environment with system performances optimizations, system parameters configurations, and advanced methods development.

Suppose there is a cognitive radio communication transmitter-receiver pair, operating in an open wireless environment where there could be intentional and unintentional RFI signals. The communication pair are separated with distance $d_{TR}$. The information bits at the transmitter are divided into frames. In each frame, there are L uncoded information bits and $L_0$ overhead bits. The information bits and overhead bits are encoded with a channel encoder with coding rate r. For a system with M-ary modulation scheme, the number of symbols in each frame is $L_s=(L+L_0)/(r \log_2 M)$, where L is chosen in a way such that $L_s$ is an integer.

To avoid severe RFI, the transmitter and receiver employ a frequency hopping (FH) scheme. Suppose there are N channels for the cognitive communication pair to communicate.

For different types of RFI, there are $1 \leq n \leq N$ sub-channels that could be interfered. Therefore, considering both intentional and unintentional interference, the received signal samples in discrete-time at receiver can be represented with the unified interference model as $$y_m = \sqrt{E_r} h_m^{(TR)} x_m + \sqrt{E_I} h_m^{(IR)} k_m + z_m + n_m, m=1,2,\ldots,L_s$$

where $E_r$ and $E_I$ are the average received symbol energy from transmitter and synchronized aggregated RFI nodes respectively; $x_m \in S$ is the m-th modulated symbol at transmitter, with S being the modulation alphabet set with the cardinality M=|S|, $k_m$ and $z_m$ are the unknown synchronized interference and rest overall interference signal during the m-th symbol period, $y_m$, $h_m^{(TR)}$, $h_m^{(IR)}$, and $n_m$ are the received sample, the fading coefficient between transmitter and receiver, the fading coefficient between the aggregated RFI node and receiver, and additive white Gaussian noise (AWGN) with single-sided power spectral density $N_0=2\sigma^2$, respectively. The $z_m$ can be modeled as a Gaussian random variable with mean $\mu$ and variance $2\alpha^2$, which is quite flexible to model many weak interferes with varied $\mu$ and $2\alpha^2$ values. It is assumed that the transmitter and aggregated RFI node transmit each signal to receiver undergoes different path, therefore providing the independent path fading of $h_m^{(TR)}$ and $h_m^{(IR)}$.

To quantify the communication pair transmission effectiveness, spectral efficiency (SE) and energy efficiency (EE) are utilized as two metrics. The SE, $\eta_{SE}$ is defined as the average data rate per unit bandwidth, which quantifies how efficiently the spectrum is utilized to transmit information. The EE, $\eta_{EE}$, is defined as the successfully transmitted information bits per unit energy, which quantifies the average energy consumption to successfully transmit an information bit.

Based on the spectrum efficiency definition, the communication pair system SE can be represented as $$\eta_{SE} = \frac{R_d}{(1+\beta)R_s}$$

where $R_d$ is the net data rate of the successfully transmitted information bit, $(1+\beta)R_s$ is the signal occupied bandwidth with $\beta$ being the roll-off factor of the pulse shaping filter and $R_s$ is the gross symbol rate. Note that in RF open wireless communications, each frame cannot be guaranteed to be transmitted successfully in one transmission attempt, because of the signal distortions caused by channel fading, intentional and unintentional interference, and noise, etc. Therefore, retransmissions must be incorporated to obtain the $\eta_{SE}$.

The probability that a frame can be successfully transmitted equals to $1-\Phi$, where $\Phi$ is the system outage probability which quantifies the frame transmission quality-of-services (QoS). Note that the communication system outage depends on many system parameters, including received signal-to-interference-plus-noise ratio (SINR), the transmission modulation and channel coding scheme, and the FH design, etc. For an automatic repeat request (ARQ) protocol, the average number of retransmissions is $$\Lambda = \frac{1}{1-\Phi}$$

The system spectrum efficiency can then be calculated as $$\eta_{SE} = \frac{L}{L+L_0} \frac{r\log_2 M}{1+\beta}(1-\Phi)$$

Next, we derive the cognitive radio system energy efficiency in the condition of RFIs. Denote $E_b$ as the average energy per uncoded information bit received at the receiver during one transmission attempt. The average SINR at the receiver is therefore $$\gamma_b = \frac{E_b}{E_I + |\mu|^2 + 2\alpha^2 + N_0}$$

With a large-scale power path-loss model, the energy consumption for each symbol transmission at transmitter is $$E_s = E_r G_1 d_{TR}^\kappa M_l$$

where $\kappa$ is the path-loss exponent, $G_1$ is the gain factor at a unit distance including path-loss and antenna gain, and $M_l$ is the link margin compensating the hardware process variations and other additive background noise and interference.

To derive a comprehensive energy efficiency of a communication system, the hardware energy consumption must be added to the information transmission energy consumption, which is positive proportional to the transmission energy consumption, which can be modeled as $$E_c = \left(\frac{\xi_M}{\eta_A} - 1\right)E_s + \frac{\omega}{R_s}$$

where $\eta_A$ is the drain efficiency of the power amplifier, $\xi_M$ is the peak-to-average power ratio (PAPR) of an M-ary modulation signal, and $\omega$ incorporates the effects of baseband processing at both transmitter and receiver, including signal processing, modulation and demodulation, channel encoding and decoding, etc, which can be treated as a constant in a frame with a designed transceiver structure.

The total energy consumption for the transmission of an information bit in one transmission attempt, $E_0=(E_s+E_c)L_s/L$ can be represented as $$E_0 = \frac{L+L_0}{L} \frac{\gamma_b \xi_M G_d (E_I + |\mu|^2 + 2\alpha^2 + N_0)}{\eta_A} + \frac{\omega}{R_b}$$

where $G_d = G_1 d_{TR}^\kappa M_l$ and $R_b = R_s L/L_s$ is the net bit rate of uncoded information bits.

Considering the frame retransmissions, the total required energy to successfully transmit an information bit from the transmitter to the receiver can then be obtained.

For the cognitive radio communication pair, it is desired to achieve both large SE and EE; however, the two metrics construct the fundamental trade-off in wireless communications. For a larger system SE, it is better for the transmitter to ensure the successful transmission probability of each frame by utilizing spectrum efficiently; which however requires more energy support, resulting in smaller EE, and vice versa.

Therefore, instead of maximizing either SE or EE, without considering the other one, we utilize a unified metric SEE (Spectral/Energy Efficiency) for a general trade-off configuration between SE and EE to fit for various scenarios and different system performances requirements. The SEE is defined as $$\eta_{SEE} = \eta_{SE}^{1-\lambda} E_t^\lambda$$

where $\lambda$ is the weight that represents the system preference of SE and EE, satisfying $0 \le \lambda \le 1$. It can be seen that maximizing the SEE will increase $\eta_{SE}$ or reduce energy consumption $E_t$, thus achieving a balanced trade-off between the SE and EE. Besides, the SEE is general and can be easily reduced to situations considering only the maximization of SE or EE for different system scenario requirements, i.e., $\lambda$ can be set to 1 for a system considering only maximizing the EE for a device long working life time, and $\lambda$ set to 0 for spectrum resource maximum utilization. With the derivation of $\eta_{SE}$ and $E_t$, the $\eta_{SEE}$ can then be obtained.

The unified metric $\eta_{SEE}$ incorporates a number of system parameters, including SINR at the receiver, the number of information bits L in each frame, the information transmission modulation and channel coding scheme, and the system outage probability $\Phi$ which inherently depends on all the above parameters, with the weight coefficient $\lambda$ to adjust preference weights between SE and EE.

It can be seen that the analysis of $\eta_{SEE}$ relies on the system outage $\Phi$ expression, $$\Phi_0 = f(\gamma < \gamma_0)$$

where $\gamma_0$ is the SINR threshold.

To obtain insights of an interference impact to SATCOM communication pair for further adaptive configurations, $|h_m^{(TR)}|^2$ is set to 1 and $\chi_I = |h_m^{(IR)}|^2 \ge 0$ is modeled with general Nakagami distribution, which is $$f(\chi_I) = \left(\frac{m_1}{\overline{\chi_I}}\right)^{m_1} \frac{\chi_I^{m_1-1}}{\Gamma(m_1)} \exp(-m_1 \chi_I) d\chi_I$$

where $m_1$ is the channel fading shape factor and $\Gamma(\cdot)$ is the incomplete gamma function. Note that the general Nakagami fading channel is flexible to model different channels, including AWGN, Rayleigh, and Rician fading channel.

The FH system outage can then be expressed as $$\Phi_0 = \frac{1}{\Gamma(m_1)} \Gamma\left(m_1, \frac{m_1 P_r}{\gamma_0 P_I} - \frac{m_1 B}{P_I}(|\mu|^2 + 2\alpha^2 + N_0)\right)$$

For a FH system, the center frequency of the communication pair varies with the assigned pseudo-random sequence, where the transmitted frequency can be treated as selected uniformly from the total frequency bandwidth W. Therefore, the RFI signals could not always interfere with the communication system, and FH scheme has shown to be an effective anti-RFI technique in a severe hostile environment. The probability of a transmitted signal will be interfered is n/N.

Suppose the total signal transmission power and interference received power of aggregated RFI signals on the whole available bandwidth is P and $P_J$, respectively. The interference power on each channel for different types of RFI is then $P_J = J_0 B = P_J/n$, where $J_0$ is the interference power spectral density.

Therefore, the average outage probability for a FH system with RFIs, is $$\Phi = \frac{n}{N\Gamma(m_1)} \Gamma\left(m_1, \frac{nm_1 P}{N\gamma_0 P_J G_d} - \frac{nm_1 W}{NP_J}(\Omega + N_0)\right)$$

where $\Omega = |\mu|^2 + 2\alpha^2$.

Finally, the unified communication pair performance evaluation metric expression is $$\eta_{SEE} = \left[1 - \frac{n}{N\Gamma(m_1)} \Gamma\left(m_1, \frac{nm_1 P}{N\gamma_0 P_J G_d} - \frac{nm_1 R_b (1+\beta)(\Omega + N_0)}{r\log_2 MNP_J} \frac{L+L_0}{L}\right)\right]$$
$$\left(\frac{L}{L+L_0} \frac{r\log_2 M}{1+\beta}\right)^{1-\lambda} \left[\frac{P\xi_M + \eta_A \omega}{R_B \eta_A}\right]^{-\lambda}$$

At the same time, a practical cognitive radio transceiver always has a power limit, satisfying $0 < P \le P_0$, where $P_0$ is the transmission power constraint.

The system optimum design for cognitive radio configuration, including power control P, information bits rate control $R_b$, the modulation scheme, and channel coding scheme, which can maximize the communication system unified SEE is discussed. Note that in many communication standards, the modulation schemes and channel coding schemes are often paired with each other to form a modulation and coding (MODCOD) combination table, such as in Digital Video Broadcasting-Satellite-Second Generation (DVB-S2) standard.

The optimization problem to a tuple $(P, R_b, (M, r))$ can be represented as maximize $\eta_{SEE}$ subject to $0 < P \le P_0$, $R_b > 0$, $0 < r < 1$, and $M \in K^+$ with $\eta_{SEE}$ the developed general metric SEE and K refers to the set of all natural numbers.

Due to the high complexity representation and non-linearity of $\eta_{SEE}$, we transform the optimization metric to $\Psi = \log \eta_{SEE}$. Note that because of the monotonically increasing function of $\eta_{SEE} = \exp(\Psi)$, the maximum $\Psi$ gives the maximum $\eta_{SEE}$.

To solve the optimization problem, the constrained optimization is relaxed to the unconstrained problem, and by setting $\partial \Psi / \partial P = 0$ with $\partial \Psi / \partial R_b = 0$.

Power Selection (POWSEL): For a cognitive radio frequency hopping communication system in the RFI environment, the optimum transmission power P that maximizes the unified SE and EE is given by $\min[P', P_0]$, where $P' > 0$ is the solution of the following equation and $P' = +\infty$ when the following equation does not have solution.

$$\frac{1}{1 - \frac{n}{N} \frac{\Gamma\left(m_1, \frac{nm_1 P}{N\gamma_0 P_J G_d} - \frac{nm_1 R_b(\Omega + N_0)}{r\log_2 MNP_J L_\beta}\right)}{\Gamma(m_1)}}$$
$$\frac{n}{N\Gamma(m_1)} \exp\left(-\frac{nm_1 P}{N\gamma_0 P_J G_d} + \frac{nm_1 R_b(\Omega + N_0)}{r\log_2 MNP_J L_\beta}\right)$$
$$\left(\frac{nm_1 P}{N\gamma_0 P_J G_d} - \frac{nm_1 R_b(\Omega + N_0)}{r\log_2 MNP_J L_\beta}\right)^{m_1 - 1} \frac{nm_1}{N\gamma_0 P_J G_d} = \lambda \frac{\xi_M}{R_B \eta_A}$$

Data Rate Selection (DRSEL): For a cognitive radio frequency hopping communication system in the RFI environment, the optimum information bits data rate $R_b$ that maximizes the unified SE and EE is given by $$R_b = \frac{r\log_2 ML_\beta}{\gamma_0 \xi_M G_d(\Omega + N_0)} (P\xi_M + \eta_A \omega)$$

It can be seen that the closed-form solution of $R_b$ is expressed as a function of the transmission power P, employed modulation scheme and channel coding scheme. Therefore, for a communication system with fixed values of above system parameters, the optimum value of information bits rate control can be directly calculated.

However, for a cognitive transmitter, which may have the capability to adjust all the above system parameters, where the joint optimization of transmission power P, information bits rate $R_b$, and MODCOD is required. To obtain the joint optimum values of tuple $(P, R_b, (M, r))$, the above two equations can be treated as two system equations of the parameters. However, due to the nonlinear functionality and high complexity to obtain the necessary conditions for $(M, r)$, the optimum solution for tuple $(\hat{P}, \hat{R}_b, (\hat{M}, \hat{r}))$ is not easy to be directly obtained. An iterative algorithm is developed to obtain the joint optimum values of P, $R_b$, and $(M, r)$. In the iterative algorithm, a different MODCOD pair is looped with input system parameters. In each MODCOD loop, the data rate is firstly initialized as a known value. With POWSEL, the transmission power can be calculated. After obtaining the transmission power, the data rate is updated with DRSEL. If the data rate converges, the system performance of unified spectrum and energy efficiency metric is outputted; otherwise, the transmission power is further updated with the POWSEL until the data rate converge. After the MODCOD are all traversed in the outer loop, the system performance metric maximum value is picked up, and the joint power control, data, rate control, and MODCOD values are outputted as well.

For the SATCOM interferences mitigations, the channel coding method is an enhanced design, which includes concatenated outer coder and inner coder. The inner code is LDPC code for long frame information recovery in hostile environments. The outer code can be selected between BCH coding and turbo coding to further recover distorted information in different interferences environment. The switch of BCH coding and turbo coding is performed with baseband signaling MODCOD to ensure the SATCOM link performances in various interferences situations.

Synchronization is considered in SATCOM system design when tracking a phase-shift keying (PSK) signal, especially when the initial frequency error is comparable to the loop bandwidth. In order to improve frequency acquisition, an automatic frequency control (AFC) augmentation is used with a composite AFC/Costas loop by combining both the AFC loop with a phase-locked loop (PLL) Costas loop for carrier frequency recovery. In this composite design, pull-in from both frequency and phase errors is feasible. The AFC/Costas loop combination filter coefficient setting can be evaluated theoretically. Improved frequency and phase acquisition can be realized by changing the first order AFC/Costas loop to the second order. In the composite AFC/Costas loop, phase detectors are applied to obtain the phase differences between the received signal and reference signal, where the phase differences can be used to generate the phase and frequency control signals.

Besides the link-level waveform optimizations and recovery, the beamforming control and interferences nulling for multiple users communications are also incorporated in the system design to mitigate unintentional and intentional RFIs. The antenna transmission hardware system consists of multiple cells, where each cell consists of small number of antenna elements. Each cell can form its own independent beam angle. The system utilizes the antenna polarization diversity to share the signal spectrum and maximize the number of channel usage. The system explores signal and noise direction finding, and apply beam forming to the desired signal and null to the noise source. The system arranges individual cell beam forming angles to reduce the fading and track the fast speed objects.

For multiple-user beamforming, suppose a transmitter is equipped with $M_t$ antennas, and there are U active terminals where each active user is equipped with $M_u$ antennas, satisfying $M_t \geq \Sigma_{u=1}^{U} M_{r,u}$. In the beamforming, the received signal $y_u$ at active user u can be described as $y_u=H_u x+w_u$, where $H_u$ is the channel matrix between the transmitter and the active user u, x is the transmission signal, $w_u$ is the AWGN noise received by active user u. Therefore, the whole system can be written as $$y = Hx + w, \text{ with } y \triangleq \begin{bmatrix} y_1 \\ \vdots \\ y_U \end{bmatrix}, H \triangleq \begin{bmatrix} H_1 \\ \vdots \\ H_U \end{bmatrix} \text{ and } w \triangleq \begin{bmatrix} w_1 \\ \vdots \\ w_U \end{bmatrix}.$$

In realistic implementations, a linear precoding method of block diagonalization is applied for the rates promised in the multiple-user multiple-input multiple-output (MIMO) channel, rather than dirty paper coding which requires the transmitter knew all the of channels information, which could be not practical. The multiple-user MIMO system is thus able to be decomposed into several independent single-user MIMO communications with the linear precoding.

For the interference mitigation development at receiver, a notch filter is applied to reduce the interference power. A joint interference nulling and post-coding beamforming technique is further developed. Note that if the receiver side is only equipped with a single antenna, the interference nulling is skipped. For multiple antennas equipped receiver with interference nulling, the interferences channels are estimated, based on which post-coding matrices are calculated by finding the null space of other channels.

For instance, the received signal for terminal i can be written as:

$$r_i = W_i H_i u_i + W_i \sum_{k=1, k \neq i}^{N} H_k u_i + W_i \sum_{l=1}^{M} H_l u_l + n_i$$

where $W_i H_i u_i$ is our desired signal with post-coding matrix $W_i$. The interference signals are $\Sigma_{k=1,k\neq i}^{N} H_k u_i$, since $W_i$ is in the null space of other users' channel, this term is cancelled out with $W_i \Sigma_{l=1}^{M} H_l u_l$. The actually received signal after post-coding matrix can be rewritten as $r_i = W_i H_i u_i + n_i$, where the RFI interference is largely removed. For the adaptive nulling, the thinned phased array and the multiple-beam antenna techniques are combined to form a robust antenna technique design.

Because of SATCOM long-haul distance communications with stringent mission requirements, plenty of SATCOM network resources need to be managed in a global system view. A game theoretic engine controller is designed to interact with each designed component and dynamically configure the resources to ensure the SATCOM networking various traffic requirements, anti-jamming capability, and large network throughput. The resources include multiple antennas configurations, frequency hopping sub-carriers, channel coding gains, data rate, packet scheduler priority settings, and traffic offloading. The main benefit to utilize game theoretic engine (GTE) rather than the rule-based radio resource management scheme is that GTE is able to model the interactions between SATCOM networking nodes and opponents' nodes, so that the ground station is able to adjust network resources fast and accurately, while considering the cognitive opponents' dynamic change as well.

There are plenty of GTE approaches in the literature, we utilize a multi-level hierarchical Stackelberq GTE, since different nodes in SATCOM could have different capabilities. In Stackelberq game, the leader in a coalition area is chosen with the node having the most reliable sensing results in a benign environment which also has moderate resources such as computing resource, energy resource, etc. The collaborative utility function can then be expressed as $u(u_i,n,H)$, where n is the selected collaborative terminals, and H represents the channel fading between the leader terminal and follower terminals. The utility function of each link is effective data rate $u_i = \Sigma_{n \in [1,N]} f_n r \log_2 M(1-\text{FER}(\text{SINR},(M,r)))$, where $f_n$ represents the frequency hopping pattern in the N total channels, M is the modulation constellation size, r is the coding rate, and FER is the frame error rate which is a function of several system parameters including the MIMO precoding matrix $w_i$, received signal to interference and noise ratio (SINR), and MODCOD. We maximize the collaborative utility function under various costs in the leader terminal. The follower terminals then listen to the initial resource assignment decision from leader terminal and report its decision. In the leader terminal, the results are fused and broadcast in the coalition area. The game reaches its equilibrium when each follower is able to pair with the leader. With the equilibrium point, the frequency hopping pattern, MIMO precoding matrix, MODCOD, and received SINR requirement can be determined.

Upon effective power control and waveform detections, the SINR estimation is important in complex mission environments. The symbol soft information can be iteratively updated for effective SNR estimator in both hostile and benign environments.

In SATCOM, many field tests have demonstrated the spectrum sparsity in time and space domain, thus stochastic traffic. We apply traffic analysis and prediction to improve SATCOM system performances, including reducing energy consumption, reducing end-to-end delay, and increasing spectrum efficiency. Actually, the different traffic, including audio, video, and data have different statistical models and QoS requirements, which makes traffic analysis and prediction desirable for guaranteed services. The short time scale traffic prediction is focused to avoid large time data gathering and processing, large power consumption, and large time data packets waiting. Support vector machine (SVM) with Laplacian kernel is applied in the system design because of its effectiveness of absence of local minima and the sparseness of the solution. For the regression problem, we estimate the functional dependence of the output variable on an n-dimensional input variable.

Considering a training data set $D=\{(x_i,y_i) \in R^n \times R\}$, $i=1, 2, \ldots, l$ with l pairs $(x_1,y_1), (x_2,y_2), \ldots, (x_l,y_l)$ where the inputs are n-dimensional vectors $x_i \in R^n$, the outputs $y_i \in R$ are continuous values and l is the number of samples in the training data set. We resort to the Laplacian kernel to perform nonlinear regressions without mapping all input vectors $x_i$ to the feature space. The Laplacian kernel is represented as $$K(x_i, x_j) = \exp\left(-\frac{\|x_i - x_j\|}{\sigma}\right)$$

where the parameter σ is adjustable to fit different application scenarios. For the prediction performance evaluations, the SVM has important parameters that cannot be set directly from the data, which requires model tuning. We apply the cross-validation technique to evaluate how the results can be generalized to an independent data set. The measured data subsets are randomly split into k sets of approximately equal size. Initially, the first fold is established as a test set and the model is fit using the others (k−1) folds. The held out sample in the first fold is predicted by the SVM algorithm and is utilized to estimate the performance. After that, the first fold is given back to the training set. This procedure is repeated with the second fold held out, and so on. The model precision is evaluated with the average root mean square error (RMSE) defined as $$RMSE = \sqrt{\frac{1}{k}\sum_{i=1}^{k} v_i}$$

where $v_i$ is the RMSE calculated for i-th test set, given by $$v_i = \sqrt{\frac{1}{l_i}\sum_{j=1}^{l_i} (y_j - h(x_j, w))^2}$$

where $l_i$ is the number of samples in the i-th test set.

In FIG. 1, the system diagram for SATCOM interference mitigations systematic design have been depicted. Various traffic packets 101 includes audio, video, image, and text go through packet pre-processor, 102 including deleting null packets and adding cyclic redundancy check (CRC). With baseband signaling 104 selected parameters from game theoretic engine and link optimizations, the frame slicer, 103 forms a frame with varied data length and baseband signaling headers. The baseband signaling 104 includes selected modulation and channel coding (MODCOD), power control parameters, beamforming precoding indicator, and frequency hopping pattern. The forward error correction (FEC) 105 includes enhanced SATCOM channel coding scheme depicted in FIG. 2. The bit-to-symbol mapping 106 includes mapping bits to symbols based on the MODCOD. The frequency hopping (FH) 107 adjusts the transmitter frequency for different symbols based on the baseband signaling frequency hopping pattern. The beamforming 108 transmits the signal in the desired direction with baseband signaling precoding indicator and power control parameters. At the receiver, interference nulling 109 removes interferences from an undesired direction with multiple antennas processing support. For single antenna, the notch filter can be applied for 109. In 110, frequency de-hopping is processed with synchronizations to transform radio frequency (RF) signal to baseband signal for further processing. In 111, the symbol demapping process symbols to bits for FEC decoding 112. After bits recovery, several statistic performance metrics are evaluated in 113 including bit error rate and frame error rate. With the evaluated epoch system performances and SATCOM situation awareness 114 information, game theoretic engine 115 is able to be executed for various traffic control methods for 101 and provide baseband signaling information for 104. The 114 situation awareness information includes channel signal-to-noise-and-interference (SINR) information in each carrier, interferences direction obtained with angle of arrival method, and data traffic analysis and prediction.

In FIG. 2, the enhanced SATCOM channel coding scheme for interferences mitigation is depicted. The formed frame bitstream goes through a switch 201 which controls the encoding scheme outer code BCH coding 202 and turbo coding 203, in conjunction with the inner code 204. The switch is performed with baseband signaling MODCOD to deal with different interferences situation.

In FIG. 3, the BCH coding scheme is shown. For different BCH coding length 301, the decimal range for searching is firstly determined in 302. After obtaining the decimal range, the different decimal number is looped in 303. In 304, it looks up if the primitive polynomial vector is existed or not. In 305, it determines the summation of binary coefficient is even or not. In 306, the current coefficients are evaluated to see if the maximal linear-feedback shift register (LFSR) sequence can be provided. If yes, the current polynomials and its reciprocal polynomial are then recorded in 307. If the number in the range has all been looped in 308, the primitive polynomial vector is then outputted in 309, which is provided for BCH coding 310.

In FIG. 4, the cognitive radio joint power control, rate control, and MODCOD adaptive configuration in the physical layer is performed. With the input system parameters 401, the different MODCOD pair is looped in 402. The loop initial data rate and transmission power are set in 403. With POWSEL, the transmission power in the current loop is calculated in 404. The data rate is further calculated with DRSEL in 405. In 406, the data rate converges or not is determined. If converged, it goes to 407 where the unified spectrum and energy efficiency metric is outputted; otherwise, it goes to 404 for further transmission power calculation. In 408, it decides if the MODCOD are all traversed. If the MODCODs are all transversed, the metric maximum value is picked up in 409, and the joint power control, data rate control, and MODCOD values are outputted in 410.

In the game each carrier is formed in the transmission.

In FIG. 5, it depicts an exemplary cognitive radio testbed apparatus for implementing an exemplary interferences mitigation method in a SATCOM system according to various disclosed embodiments. The exemplary cognitive radio testbed apparatus may be a hardware setup including DVB-S2 transmitters and receivers, where digital modulation M-ary phase shift keying (MPSK) modulation is used.

For example, several interferers may try to interrupt the data transmission from a transmitter to a receiver. A Universal Software Radio Peripheral (USRP) and Gnu's not Unix (GNU) Radio based hardware testbed apparatus has been implemented to demonstrate the integrated game theory and link optimizations enabled spectrum management and waveform adaptations. It is emulated that the interference and anti-interference conflicts in the frequency band of 1.3 GHz to 1.6 GHz.

When transmitting video stream or video data, interference and anti-interference experiments may be performed using the hardware-in-loop implementation setup as shown in FIG. 5. As a result, the adaptive configurations guided by the disclosed game strategies and link optimizations can maintain video streaming in the congested environment with inadvertent interferers.

As such, in addition to the game theoretic model and link optimizations for interferences mitigation waveform adaptations, the present disclosure also provides a hardware-in-loop cognitive radio testbed apparatus used for implementing the disclosed interferences mitigation methods in a SATCOM system. An exemplary testbed apparatus includes a RF transmitter, a RF receiver, and interferences, each with Universal Software Radio Peripheral (USRP) and Gnu's not Unix (GNU) Radio to demonstrate the game theoretic and link optimizations anti-jamming capabilities via spectrum management and waveform adaptations. In embodiments, the hardware testbed apparatus may include a set of DVB-S2 transmitters and receivers.

While the disclosure has been illustrated with respect to one or more implementations, alterations and/or modifications can be made to the illustrated examples without departing from the spirit and scope of the appended claims. In addition, while a particular feature of the disclosure may have been disclosed with respect to only one of several implementations, such feature may be combined with one or more other features of the other implementations, as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g. −1, −1.2, −1.89, −2, −2.5, −3, −10, −20, −30, etc.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A systematic interferences mitigation system for satellite communications (SATCOM) network under interferences environment, comprising:
a receiver configured to:
perform a first-level SATCOM link modeling in conditions of both unintentional interferences and intentional interferences;
based on the first-level SATCOM link modeling, evaluate a modeled SATCOM link quality in the conditions of both the unintentional interferences and the intentional interferences;
optimize the evaluated SATCOM link quality and configure SATCOM link transmission parameters in the conditions of both the unintentional interferences and the intentional interferences;
perform a second-level SATCOM network modeling based on interactions between SATCOM nodes and opponents' nodes;
based on the second-level SATCOM network modeling, evaluate a modeled SATCOM network quality in the condition of both the unintentional interferences and the intentional interferences; and
optimize the evaluated SATCOM network quality and configure SATCOM nodes transmission parameters in the condition of both the unintentional interferences and the intentional interferences.

2. The system according to claim 1, wherein:
in the first-level SATCOM link modeling, SATCOM link is modeled with unified interferences modeling considering both the unintentional interferences and the intentional interferences as:

$$y_m = \sqrt{E_r}\, h_m^{(TR)} x_m + \sqrt{E_I}\, h_m^{(IR)} k_m + z_m + n_m, \; m = 1, 2, \ldots, L_s$$

where:
$E_r$ and $E_I$ are average received symbol energy from transmitter and from synchronized aggregated radio frequency interference (RFI) node respectively,
$x_m$ is m-th modulated symbol at the transmitter,
$k_m$ and $z_m$ are unknown synchronized interference and rest overall interference signal during a m-th symbol period,
$L_s$ is number of symbols in one frame,
$y_m$, $h_m^{(TR)}$, $h_m^{(IR)}$, and $n_m$ are received sample, fading coefficient between the transmitter and the receiver, fading coefficient between the aggregated RFI node and receiver, and additive white Gaussian noise (AWGN), respectively; and
wherein $z_m$ is modeled as a Gaussian random variable with mean $\mu$ and variance $2\alpha^2$;
wherein assuming that the transmitter and the aggregated RFI node transmit each signal to the receiver using different paths, the path fadings of $h_m^{(TR)}$ and $h_m^{(IR)}$ are independently provided; and
wherein channel coefficient $|h_m^{(IR)}|^2 \geq 0$ is modeled with general Nakagami fading distribution.

3. The system according to claim 1, wherein:
a link quality of average outage expression for SATCOM employing frequency hopping is expressed as:

$$\Phi = \frac{n}{N\Gamma(m_1)} \Gamma(m_1, P_o)$$

where $m_1$ is the aggregated interference,
$\Gamma(\cdot)$ is an incomplete gamma function,
$P_o$ is a cumulative signal-to-noise ratio obtained from link unified interferences modeling, and
n and N are interferences occupied channel number and SATCOM link transmission pair total available channel number, respectively; and a final link quality of SATCOM link is a unified spectral/ energy efficiency $\eta_{SEE}$:

$$\eta_{SEE} = \eta_{SE}^{1-\lambda}/E_t^{\lambda}$$

where $\Phi$ is a satellite link system average outage; $\eta_{SEE} = (1-\Phi)\eta_o$ is satellite link spectral efficiency with $\Phi$; and $\eta_o$ is satellite link spectrum efficiency in one transmission attempt;

$$\frac{1}{Et} = (1-\Phi)/E_o$$

is satellite link energy efficiency with $E_o$; $E_o$ is a satellite link energy consumption in one transmission attempt; and $\lambda$ is a weight that represents link performances preference of satisfying $0 \le \lambda \le 1$.

4. The system according to claim 1, wherein:
a transmission power of a SATCOM link is configured with a power selection lemma;
a data rate of a SATCOM link is configured with a data rate selection lemma; and
a modulation and coding (MODCOD) pair of a SATCOM link is configured with an iterative algorithm,
wherein a different MODCOD pair is looped with input system parameters, and in each MODCOD loop, the data rate is firstly initialized as a maximum allowed value, with the data rate power selection lemma, the transmission power is calculated;
wherein after obtaining the transmission power, the data rate is updated with the data rate selection lemma,
wherein if the data rate converges, a system performance of unified spectrum and energy efficiency metric is outputted; otherwise, the transmission power is further updated with the power selection lemma until the data rate converge, and
wherein after the MODCOD are all traversed in an outer loop, the system performance metric maximum value is picked up, and a joint power control, a data rate control, and MODCOD values are outputted.

5. The system according to claim 1, wherein:
SATCOM network is modeled as a multi-level hierarchical Stackelberg game, wherein different nodes in SATCOM have different capabilities; and
a leader node in the multi-level hierarchical Stackelberg game in a coalition area is chosen who has most reliable sensing results in a benign environment which also has moderate resources including a computing resource and energy resource.

6. The system according to claim 5, wherein:
SATCOM network collaborative utility function is expressed as $u(u_i, n, H)$, where $u_i$ represents each SATCOM link utility function, n represents selected collaborative terminals, and H represents channel fading between a leader terminal and follower terminals; and
each SATCOM link utility function is effective data rate $u_i = \Sigma_{n \in [1,N]} f_n r \log_2 M(1-FER(SINR,(M,r)))$, where $f_n$ represents a frequency hopping pattern in N total channels, M represents a modulation constellation size, r represents a channel coding rate, and FER represents a satellite communication link frame error rate which is a function of system parameters including multiple-input-multiple-output (MIMO) precoding matrix $w_i$, received signal to interference and noise ratio (SINR), and MODCOD.

7. The system according to claim 6, wherein:
the collaborative utility function is maximized in the leader terminal;
the follower terminals listen to an initial resource assignment decision from the leader terminal and report a decision;
the leader terminal fuses results from the follower terminals and broadcast updated results in a coalition area; and
the multi-level hierarchical Stackelberg game reaches a game equilibrium point when each follower terminal is able to pair with the leader terminal.

8. The system according to claim 1, wherein:
in a SATCOM link development,
a channel coding is a concatenated outer coder and inner coder;
the inner coder is a low-density parity-check (LDPC) code;
the outer coder is selected between Bose, Chaudhuri, and Hocquenghem (BCH) code and turbo code; and
switching of the BCH code and the turbo code is performed with a baseband signal to noise ratio measurement, wherein when the received baseband signal to noise ratio is larger than a threshold, a BCH coding is chosen; otherwise, a turbo coding is chosen.

9. The system according to claim 1, wherein:
a SATCOM link synchronization is an automatic frequency control (AFC) augmentation with a composite AFC/Costas loop for a carrier frequency recovery; and
phase detectors are applied in the composite AFC/Costas loop to obtain phase differences between a received signal and reference signal, wherein the phase differences are used to generate phase and frequency control signals.

10. The system according to claim 1, wherein:
in a SATCOM network development, received symbol soft information is iteratively updated for an effective signal-to-noise ratio estimator in both hostile and benign environments.

11. The system according to claim 1, wherein:
in a SATCOM network development, a support vector machine (SVM) with a Laplacian kernel is applied in a SATCOM network for traffic analysis and prediction;
a training data set of a SATCOM network traffic is $D = \{(x_i, y_i) \in R^n \times R\}$, i=1, 2, . . . , l with l pairs $(x_1, y_1)$, $(x_2, y_2)$, . . . , $(x_l, y_l)$ where the inputs are n-dimensional vectors $x_i \in R^n$, the outputs $y_i \in R$ are continuous values and l is the number of samples in the training data set;
regression of an SVM output variable depends on an n-dimensional input variable;
the Laplacian kernel is represented as:

$$K(x_i, x_j) = \exp\left(-\frac{\|x_i - x_j\|}{\sigma}\right)$$

where parameter $\sigma$ is adjustable to fit different application scenarios; and
wherein, to evaluate a prediction performance, measured data subsets are randomly split into k sets of approximately equal size; initially, a first fold is established as a test set and a model is fit using the others (k−1) folds; a held out sample in the first fold is predicted by an SVM algorithm and is utilized to estimate the prediction performance; the first fold is given back to the training set; a second fold held out is repeatedly performed; and the model precision is evaluated with an average root mean square error (RMSE) defined as:

$$RMSE = \sqrt{\frac{1}{k}\sum_{i=1}^{k} v_i}$$

where $v_i$ is the RMSE calculated for i-th test set, given by $$v_i = \sqrt{\frac{1}{l_i}\sum_{j=1}^{l_i}(y_j - h(x_j, w))^2}$$

where $l_i$ is number of samples in the i-th test set.

12. A two-level system optimizations and configurations method in a satellite communications (SATCOM) network under interferences environment, the method comprising:
performing a first-level SATCOM link modeling in conditions of both unintentional interferences and intentional interferences;
based on the first-level SATCOM link modeling, evaluating a modeled SATCOM link quality in the conditions of both the unintentional interferences and the intentional interferences;
optimizing the evaluated SATCOM link quality and configuring SATCOM link transmission parameters in the conditions of both the unintentional interferences and the intentional interferences;
performing a second-level SATCOM network modeling based on interactions between SATCOM nodes and opponents' nodes;
based on the second-level SATCOM network modeling, evaluating a modeled SATCOM network quality in the condition of both the unintentional interferences and the intentional interferences; and
optimizing the evaluated SATCOM network quality and configure SATCOM nodes transmission parameters in the condition of both the unintentional interferences and the intentional interferences.

13. The method according to claim 12, wherein:
in the first-level SATCOM link modeling, SATCOM link is modeled with unified interferences modeling considering both the unintentional interferences and the intentional interferences as:

$$y_m = \sqrt{E_r}\, h_m^{(TR)} x_m + \sqrt{E_I}\, h_m^{(IR)} k_m + z_m + n_m, m = 1, 2, \ldots, L_s$$

where:
$E_r$ and $E_I$ are average received symbol energy from transmitter and from synchronized aggregated radio frequency interference (RFI) node respectively,
$x_m$ is m-th modulated symbol at the transmitter,
$k_m$ and $z_m$ are unknown synchronized interference and rest overall interference signal during a m-th symbol period,
$L_s$ is number of symbols in one frame,
$y_m$, $h_m^{(TR)}$, $h_m^{(IR)}$, and $n_m$ are received sample, fading coefficient between the transmitter and the receiver, fading coefficient between the aggregated RFI node and receiver, and additive white Gaussian noise (AWGN), respectively; and wherein $z_m$ is modeled as a Gaussian random variable with mean $\mu$ and variance $2\alpha^2$;
wherein assuming that the transmitter and the aggregated RFI node transmit each signal to the receiver using different paths, the path fadings of $h_m^{(TR)}$ and $h_m^{(IR)}$ are independently provided; and
wherein channel coefficient $|h_m^{(IR)}|^2 \geq 0$ is modeled with general Nakagami fading distribution.

14. The system according to claim 12, wherein:
a link quality of average outage expression for SATCOM employing frequency hopping is expressed as:

$$\Phi = \frac{n}{N\Gamma(m_1)}\Gamma(m_1, P_o)$$

where $m_1$ is the aggregated interference,
$\Gamma(\bullet)$ is an incomplete gamma function,
$P_o$ is a cumulative signal-to-noise ratio obtained from link unified interferences modeling, and
n and N are interferences occupied channel number and SATCOM link transmission pair total available channel number, respectively; and
a final link quality of SATCOM link is a unified spectral/energy efficiency $\eta_{SEE}$:

$$\eta_{SEE} = \eta_{SE}^{1-\lambda}/E_t^{\lambda}$$

where $\Phi$ is a satellite link system average outage; $\eta_{SE} = (1-\Phi)\eta_o$ is satellite link spectral efficiency with $\Phi$; and $\eta_o$ is satellite link spectrum efficiency in one transmission attempt;

$$\frac{1}{E_t} = (1-\Phi)/E_o$$

is satellite link energy efficiency with $E_o$; $E_o$ is a satellite link energy consumption in one transmission attempt; and $\lambda$ is a weight that represents link performances preference of satisfying $0 \leq \lambda \leq 1$.

15. The method according to claim 12, wherein:
a transmission power of a SATCOM link is configured with a power selection lemma;
a data rate of a SATCOM link is configured with a data rate selection lemma; and
a modulation and coding (MODCOD) pair of a SATCOM link is configured with an iterative algorithm,
wherein a different MODCOD pair is looped with input system parameters, and in each MODCOD loop, the data rate is firstly initialized as a maximum allowed value, with the data rate power selection lemma, the transmission power is calculated;
wherein after obtaining the transmission power, the data rate is updated with the data rate selection lemma,
wherein if the data rate converges, a system performance of unified spectrum and energy efficiency metric is outputted; otherwise, the transmission power is further updated with the power selection lemma until the data rate converge, and
wherein after the MODCOD are all traversed in an outer loop, the system performance metric maximum value is picked up, and a joint power control, a data rate control, and MODCOD values are outputted.

16. The method according to claim 12, wherein:

SATCOM network is modeled as a multi-level hierarchical Stackelberg game, wherein different nodes in SATCOM have different capabilities; and a leader node in the multi-level hierarchical Stackelberg game in a coalition area is chosen who has most reliable sensing results in a benign environment which also has moderate resources including a computing resource and energy resource.

17. The method according to claim 16, wherein:

SATCOM network collaborative utility function is expressed as $u(u_i,n,H)$, where $u_i$ represents each SATCOM link utility function, n represents selected collaborative terminals, and H represents channel fading between a leader terminal and follower terminals; and each SATCOM link utility function is effective data rate $u_i = \Sigma_{n \in [1,N]} f_n r \log_2 M(1 - FER(SINR_i(M,r)))$, where $f_n$ represents a frequency hopping pattern in N total channels, M represents a modulation constellation size, r represents a channel coding rate, and FER represents a satellite communication link frame error rate which is a function of system parameters including multiple-input-multiple-output (MIMO) precoding matrix $w_i$, received signal to interference and noise ratio (SINR), and MODCOD.

18. The method according to claim 17, wherein:

the collaborative utility function is maximized in the leader terminal;

the follower terminals listen to an initial resource assignment decision from the leader terminal and report a decision;

the leader terminal fuses results from the follower terminals and broadcast updated results in a coalition area; and the multi-level hierarchical Stackelberg game reaches a game equilibrium point when each follower terminal is able to pair with the leader terminal.

19. The method according to claim 12, wherein, in a SATCOM link development, a channel coding is a concatenated outer coder and inner coder;

the inner coder is a low-density parity-check (LDPC) code;

the outer coder is selected between Bose, Chaudhuri, and Hocquenghem (BCH) code and turbo code;

switching of the BCH code and the turbo code is performed with a baseband signal to noise ratio measurement, wherein when the received baseband signal to noise ratio is larger than a threshold, a BCH coding is chosen; otherwise, a turbo coding is chosen;

a SATCOM link synchronization is an automatic frequency control (AFC) augmentation with a composite AFC/Costas loop for a carrier frequency recovery; and phase detectors are applied in the composite AFC/Costas loop to obtain phase differences between a received signal and reference signal, wherein the phase differences are used to generate phase and frequency control signals.

20. The method according to claim 12, wherein, in a SATCOM network development, received symbol soft information is iteratively updated for an effective signal-to-noise ratio estimator in both hostile and benign environments;

in a SATCOM network development, a support vector machine (SVM) with a Laplacian kernel is applied in a SATCOM network for traffic analysis and prediction;

a training data set of a SATCOM network traffic is $D=\{(x_i,y_i) \in R^n \times R\}$, i=1, 2, ..., l with l pairs $(x_1,y_1)$, $(x_2,y_2)$, ..., $(x_l,y_l)$ where the inputs are n-dimensional vectors $x_i \in R^n$, the outputs $y_i \in R$ are continuous values and l is the number of samples in the training data set;

regression of an SVM output variable depends on an n-dimensional input variable;

the Laplacian kernel is represented as:

$$K(x_i, x_j) = \exp\left(-\frac{\|x_i - x_j\|}{\sigma}\right)$$

where parameter $\sigma$ is adjustable to fit different application scenarios; and wherein, to evaluate a prediction performance, measured data subsets are randomly split into k sets of approximately equal size; initially, a first fold is established as a test set and a model is fit using the others (k−1) folds; a held out sample in the first fold is predicted by an SVM algorithm and is utilized to estimate the prediction performance; the first fold is given back to the training set; a second fold held out is repeatedly performed; and the model precision is evaluated with an average root mean square error (RMSE) defined as:

$$RMSE = \sqrt{\frac{1}{k}\sum_{i=1}^{k} v_i}$$

where $v_i$ is the RMSE calculated for i-th test set, given by $$v_i = \sqrt{\frac{1}{l_i}\sum_{j=1}^{l_i}(y_j - h(x_j, w))^2}$$

where $l_i$ is number of samples in the i-th test set.

* * * * *